United States Patent
Luipold

(10) Patent No.: US 8,567,584 B2
(45) Date of Patent: Oct. 29, 2013

(54) FRICTION PLATE WITH PRESSED CORE PLATES

(71) Applicant: Schaeffler Technologies AG & Co. KG, Herzogenaurach (DE)

(72) Inventor: Chris Luipold, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/647,674

(22) Filed: Oct. 9, 2012

(65) Prior Publication Data

US 2013/0092499 A1    Apr. 18, 2013

Related U.S. Application Data

(60) Provisional application No. 61/548,414, filed on Oct. 18, 2011.

(51) Int. Cl.
  *F16D 13/64* (2006.01)
  *F16D 69/04* (2006.01)

(52) U.S. Cl.
  USPC .................................. 192/107 R; 192/113.36

(58) Field of Classification Search
  USPC ......................... 192/107 R, 113.36
  See application file for complete search history.

(56) References Cited

U.S. PATENT DOCUMENTS

| | | | |
|---|---|---|---|
| 3,841,452 A | 10/1974 | Newsock et al. | |
| 5,052,536 A | 10/1991 | Maeda | |
| 5,934,435 A * | 8/1999 | Bauer | 192/113.34 |
| 6,062,367 A | 5/2000 | Hirayanagi et al. | |
| 2006/0102443 A1 | 5/2006 | Kinoshita et al. | |
| 2007/0000747 A1* | 1/2007 | Miyazaki | 192/70.12 |

FOREIGN PATENT DOCUMENTS

KR    20100119193    11/2010

* cited by examiner

*Primary Examiner* — Richard M. Lorence
(74) *Attorney, Agent, or Firm* — Simpson & Simpson, PLLC

(57) ABSTRACT

A friction plate, including: a ring-shaped piece of friction material with an inner circumference, and first and second surfaces facing in first and second opposite axial directions, respectively; a first core plate with a first ring-shaped body, a first plurality of protrusions extending radially outward from the first ring-shaped body and imbedded in the first surface, and a second plurality of protrusions extending radially inward from the first ring-shaped body; and a second core plate with a second ring-shaped body, a third plurality of protrusions extending radially outward from the second ring-shaped body and embedded in the second surface, and a fourth plurality of protrusions extending radially inward from the second ring-shaped body. The first and second bodies are at least partially disposed radially inward of the inner circumference. The second and fourth pluralities of protrusions are for engagement with a rotatable element.

18 Claims, 5 Drawing Sheets

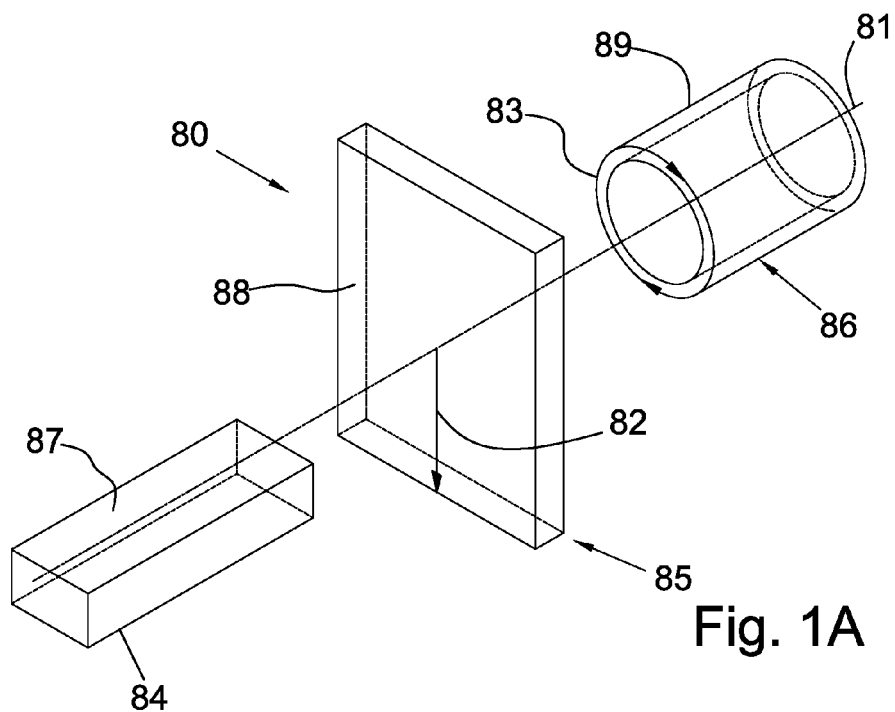
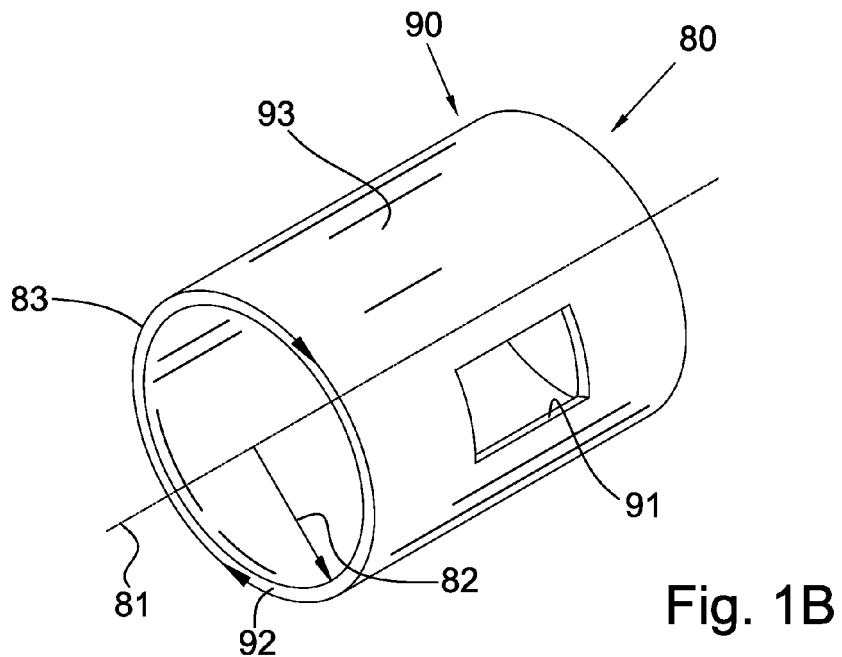

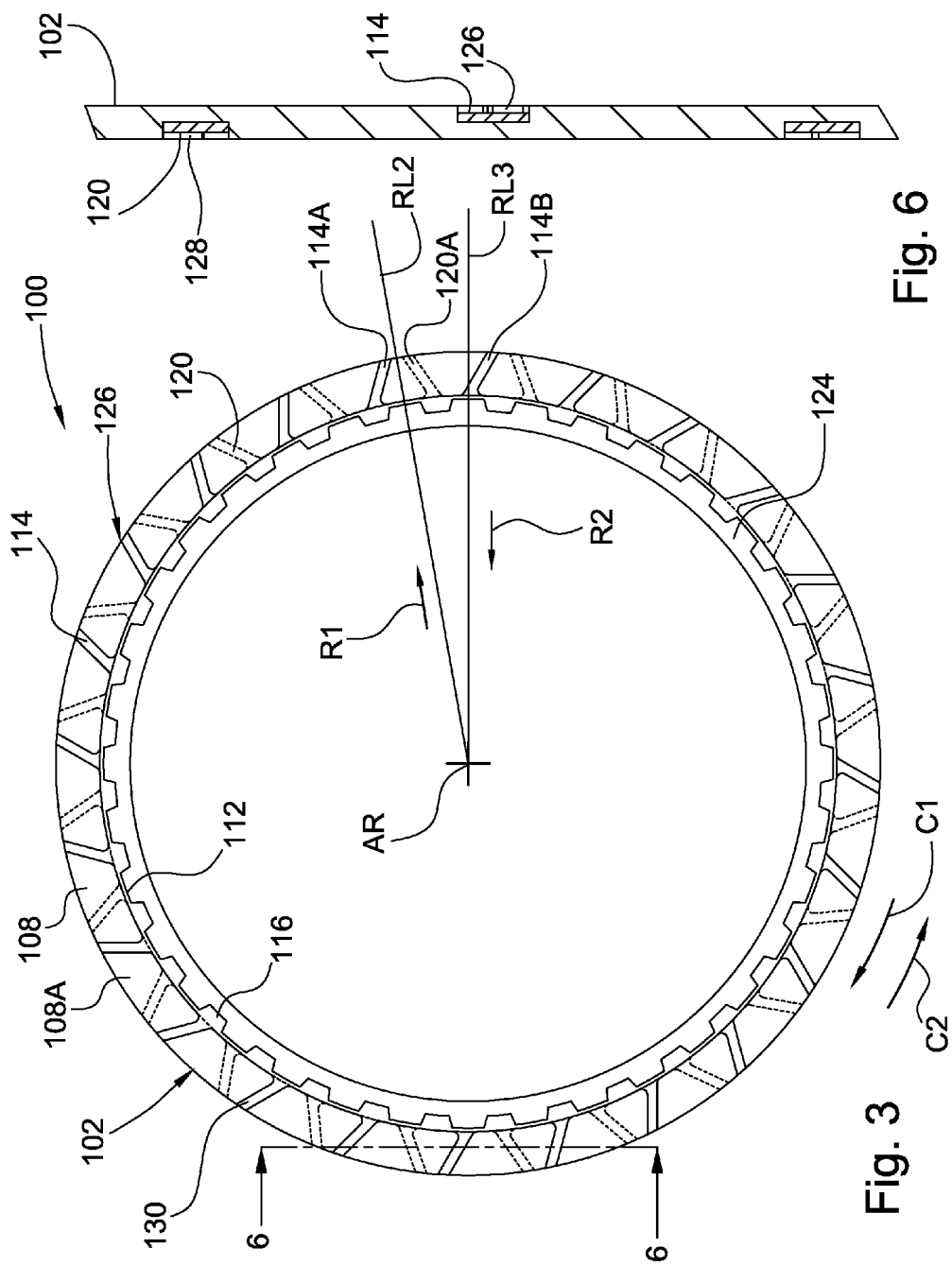

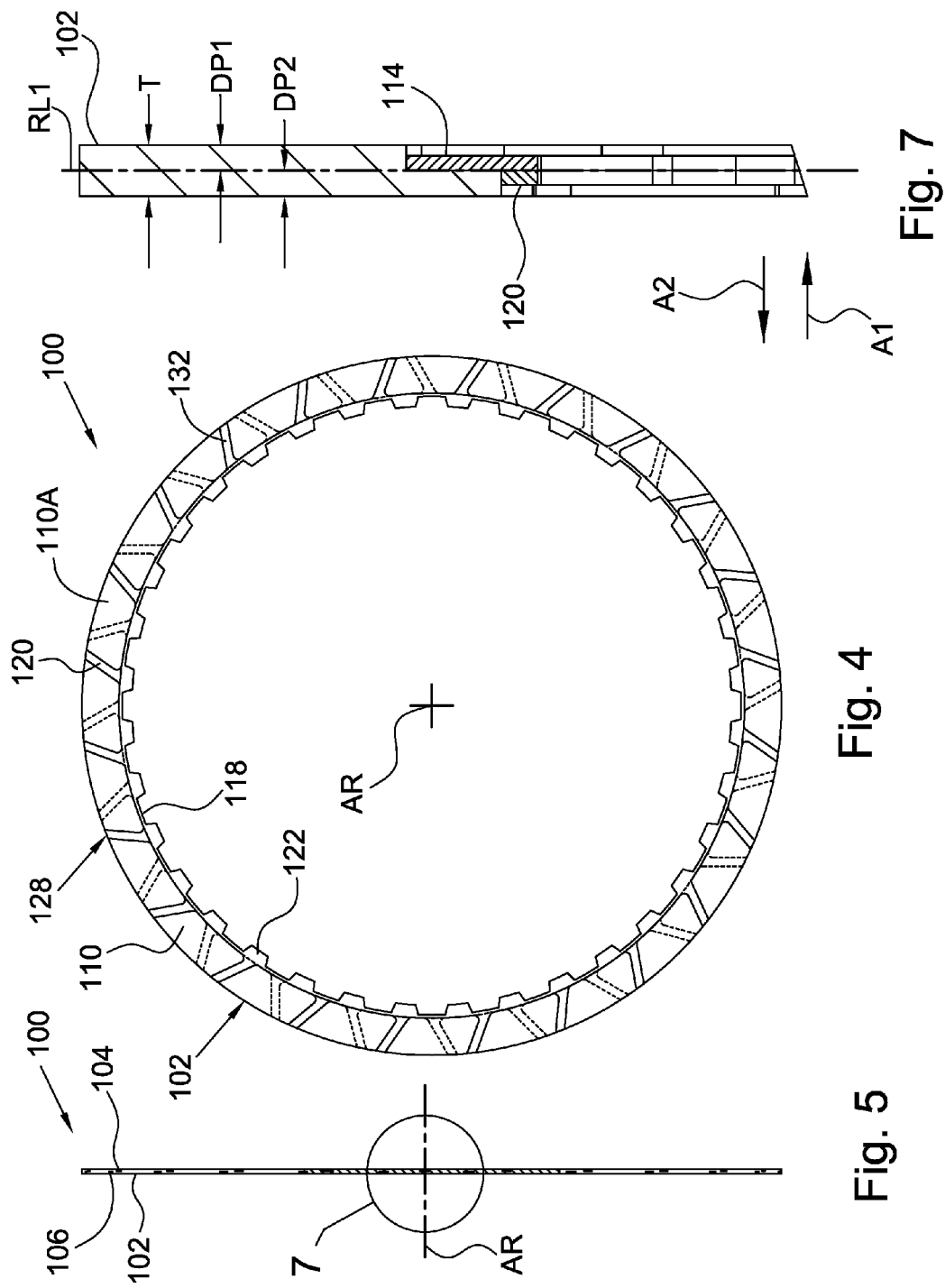

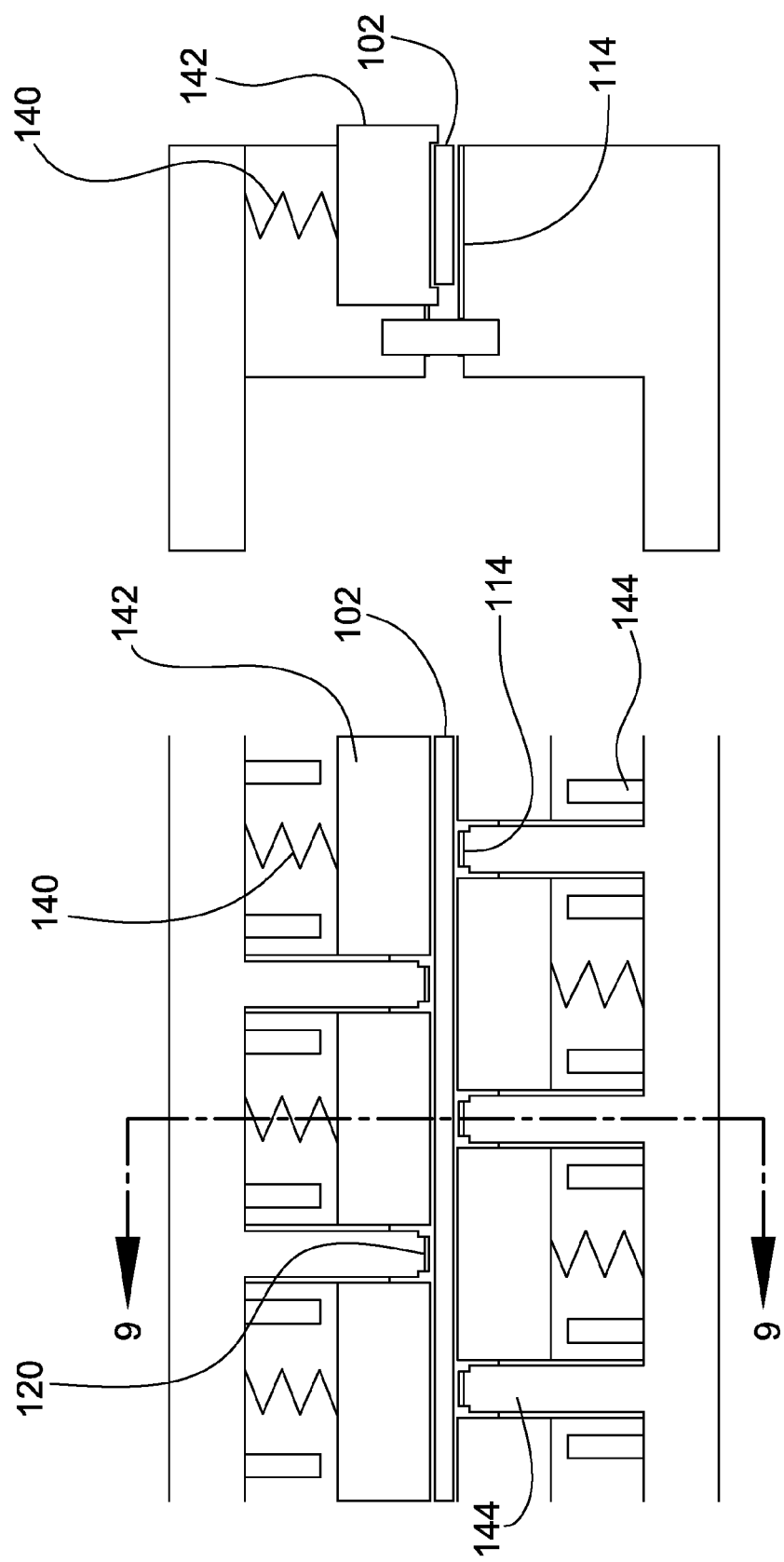

FRICTION PLATE WITH PRESSED CORE PLATES

CROSS-REFERENCE TO RELATED APPLICATIONS

This application claims the benefit under 35 U.S.C. §119(e) of U.S. Provisional Patent Application No. 61/548,414, filed Oct. 18, 2011.

TECHNICAL FIELD

The present disclosure relates to friction plates, in particular, friction plates for use in a transmission. Even more particularly, the disclosure relates to friction plates formed of friction paper without the use of adhesive.

BACKGROUND

It is known to fabricate a friction plate for a transmission by using adhesive to adhere two pieces of friction material to a metal plate. Adhesives are relatively costly and the manufacturing and use of adhesives have detrimental environmental impacts. U.S. Pat. No. 3,841,452 teaches a friction unit made of plates faced with friction material and interleaved with steel plates. The plates faced with friction material are formed by two pieces of friction material bonded together. A wire carrier is embedded in the friction material.

SUMMARY

According to aspects illustrated herein, there is provided a friction plate, including: a ring-shaped piece of friction material with an inner circumference, and first and second surfaces facing in first and second opposite axial directions, respectively; a first core plate with a first ring-shaped body, a first plurality of protrusions extending radially outward from the first ring-shaped body and tilted in a first circumferential direction, and a second plurality of protrusions extending radially inward from the first ring-shaped body; and a second core plate with a second ring-shaped body, a third plurality of protrusions extending radially outward from the second ring-shaped body and tilted in a second circumferential direction, opposite the first circumferential direction, and a fourth plurality of protrusions extending radially inward from the second ring-shaped body. The first and third pluralities of protrusions are imbedded in the first and second surfaces, respectively. The first and second bodies are at least partially disposed radially inward of the inner circumference. The second and fourth pluralities of protrusions are aligned in a axial direction and are for engagement with a rotatable element.

According to aspects illustrated herein, there is provided a friction plate, including: a ring-shaped piece of friction material with an inner circumference, and first and second surfaces facing in first and second opposite axial directions, respectively; a first core plate with a first ring-shaped body, a first plurality of protrusions extending radially outward from the first ring-shaped body and imbedded in the first surface, and a second plurality of protrusions extending radially inward from the first ring-shaped body; and a second core plate with a second ring-shaped body, a third plurality of protrusions extending radially outward from the second ring-shaped body and embedded in the second surface, and a fourth plurality of protrusions extending radially inward from the second ring-shaped body. The first and second bodies are disposed at least partially radially inward of the inner circumference. The second and fourth pluralities of protrusions are for engagement with a rotatable element.

According to aspects illustrated herein, there is provided a friction plate, including: a ring-shaped piece of friction material with inner and outer circumferences, and first and second surfaces facing in first and second opposite axial directions, respectively; a first core plate with: a first ring-shaped body; a first plurality of protrusions embedded in the first surface, extending radially outward from the first ring-shaped body, and tilted in a first circumferential direction; and a second plurality of protrusions extending radially inward from the first ring-shaped body; a second core plate with: a second ring-shaped body; a third plurality of protrusions embedded in the second surface, extending radially outward from the second ring-shaped body, and tilted in a second circumferential direction, opposite the first circumferential direction; and a fourth plurality of protrusions extending radially inward from the second ring-shaped body; a first plurality of grooves in the first surface connecting the inner and outer circumferences and at least partially formed by the first plurality of protrusions; and a second plurality of grooves in the second surface connecting the inner and outer circumferences and at least partially formed by the third plurality of protrusions. The first and second bodies are at least partially disposed radially inward of the inner circumference. The second and fourth pluralities of protrusions are aligned in a axial direction and are for engagement with a rotatable element.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application; and, FIG. 2 is an exploded view of a friction plate;

FIG. 3 is a front view of the friction plate of FIG. 2;

FIG. 4 is a back view of the friction plate of FIG. 2;

FIG. 5 is a side view of the friction plate of FIG. 2;

FIG. 6 is a cross sectional view generally along line 6-6 in FIG. 3;

FIG. 7 is a detail of area 7 in FIG. 5; and,

FIG. 8 is a schematic representations of tooling for fabricating the friction plate of FIG. 2; and, FIG. 9 is a cross sectional view generally along line 9-9 in FIG. 8.

DETAILED DESCRIPTION

Figure 2:
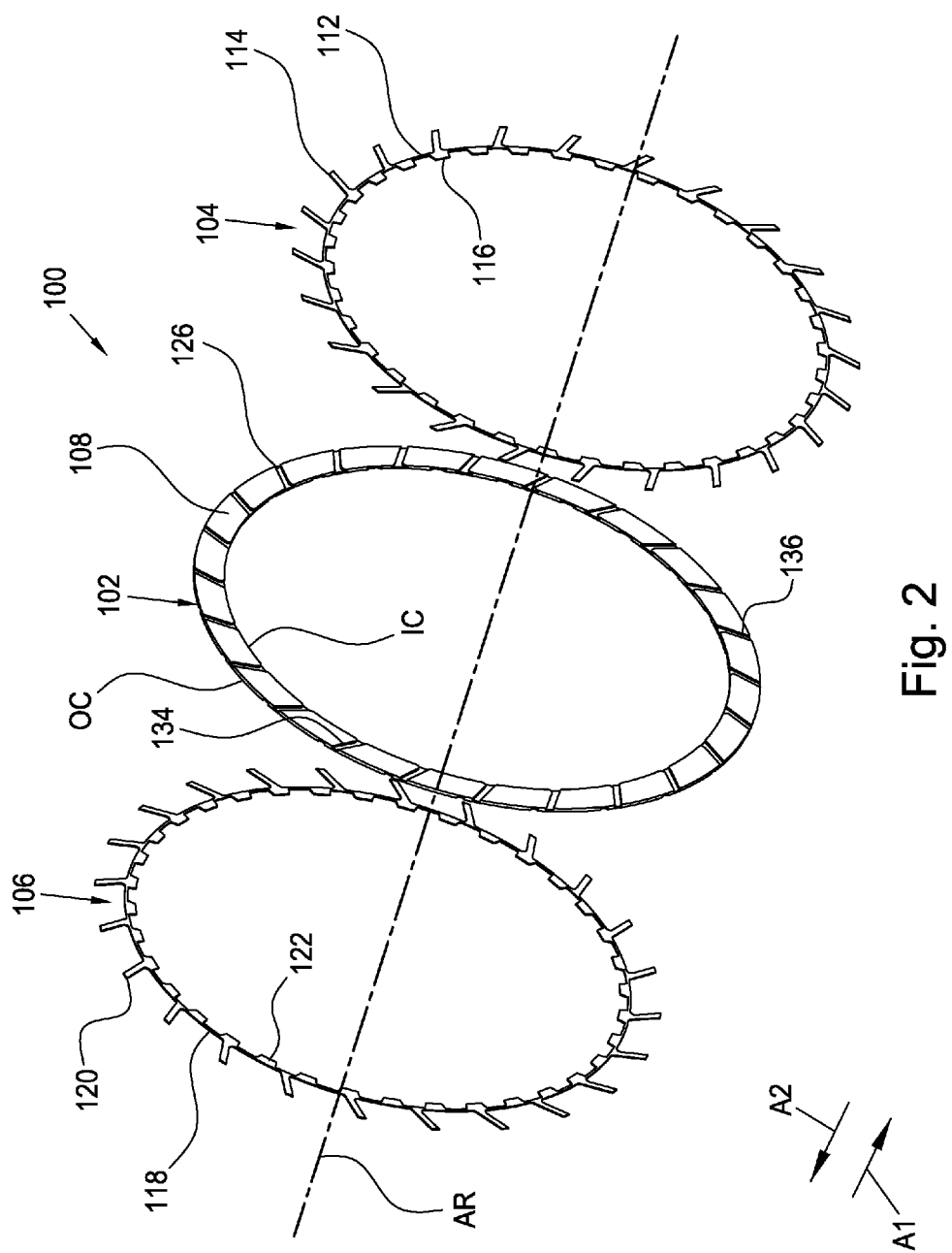

At the outset, it should be appreciated that like drawing numbers on different drawing views identify identical, or functionally similar, structural elements of the disclosure. It is to be understood that the disclosure as claimed is not limited to the disclosed aspects. Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

FIG. 2 is an exploded view of friction plate 100.

FIG. 3 is a front view of friction plate 100 of FIG. 2;

FIG. 4 is a back view of friction plate 100 of FIG. 2. The following should be viewed in light of FIGS. 2 through 4. Friction plate 100 includes ring-shaped piece of friction material 102 and core plates 104 and 106. In an example embodiment, the core plates are made of metal, for example, stamped steel. The friction material includes inner and outer circumferences IC and OC, respectively, and surfaces 108 and 110. Surfaces 108 and 110 face in opposite axial directions A1 and A2, respectively. Core plate 104 includes ring-shaped body 112, a plurality of protrusions 114 extending radially outward from body 112 and imbedded in side 108, and a plurality of protrusions 116 extending radially inward from body 112. Core plate 106 includes ring-shaped body 118, a plurality of protrusions 120 extending radially outward from body 118 and imbedded in side 110, and a plurality of protrusions 122 extending radially inward from body 118. Bodies 112 and 118 are at least partially disposed radially inward of IC. Protrusions 114 and 120 are for engagement with rotatable element 124 (shown only on FIG. 3).

FIG. 5 is a side view of friction plate 100 of FIG. 2.

FIG. 6 is a cross sectional view generally along line 6-6 in FIG. 3.

FIG. 7 is a detail of area 7 in FIG. 5. The following should be viewed in light of FIGS. 2 through 7. Protrusions 114 form respective portions of plurality of grooves 126 in side 108 connecting the inner and outer circumferences. Protrusions 120 form respective portions of plurality of grooves 128 in side 110 connecting the inner and outer circumferences. For example, grooves 126 and 128 enable flow of cooling fluid between IC and OC. Grooves 126 and 128 also can be described as follows. Radial line RL1 equally divides friction material 102 in an axial direction (A1 or A2). That is, equal portions of friction material 102 are located on either side of RL1. Protrusions 114 and 120 include surfaces 130 and 132, respectively, facing substantially in directions A1 and A2 respectively. Surfaces 130 and 132 are closer to line RL1 than portions of surfaces 108 and 110 not axially aligned with protrusions 114 and 120, respectively, for example, portions 108A and 110A. That is, one side of the grooves is formed by protrusions 114 and 120 and the remaining sides are formed by friction material 102, for example, by sides 134 and 136.

In an example embodiment, protrusions 114 and 120 terminate at the outer circumference. In an example embodiment, protrusions 114 and 120 are non-aligned in an axial direction, for example, protrusions 114A and 120A are misaligned in the axial direction. In an example embodiment, respective protrusions 114 and 120 alternate in circumferential direction C1 or C2, for example, protrusions 114A, 120A, and 114B alternate in direction C1. In an example embodiment, protrusions 114 tilt in one circumferential direction, for example, direction C1 and protrusions 120 tilt in an opposite circumferential direction, for example, direction C2.

In an example embodiment, protrusions 114 and 120 are orthogonal to IC, OC, or axis of rotation AR, that is, the protrusions are co-linear with radial lines. In an example embodiment, protrusions 114 and 120 are symmetrical about radial line RL2 or RL3 passing through axis of rotation AR and between respective protrusions 114 and 120. In an example embodiment, the respective protrusions 114 and 120, for example, protrusions 114A and 120A, taper toward RL2 in radial direction R1 from the inner circumference to the outer circumference. In an example embodiment, the respective protrusions 114 and 120, for example, protrusions 120A and 114B, taper toward from RL3 in radial direction R2 from the outer circumference to the outer circumference. It should be understood that other shapes are possible for respective portions of protrusions 114 and 120 between IC and OC, for example, jagged or zigzag shapes.

In an example embodiment, bodies 112 and 118 are in contact. In an example embodiment, protrusions 116 and 122 are aligned in an axial direction. In an example embodiment, friction material 102 has thickness T in an axial direction and respective depths of penetration DP1 and DP2 of protrusions 114 and 120 in axial directions A2 and A1 beyond surfaces 108 and 110, respectively, are no greater than one half T. In an example embodiment, T is 1.6 mm.

The core plates are pressed into friction material 102 so that protrusions 114 and 120 form grooves 126 and 128, respectively. When friction is transmitted to friction material 102 (for example, a clutch including friction material 102 is closed), the torque is transmitted from friction material 102 to rotatable element 124 via protrusions 114 and 120 and protrusions 116 and 122. The shapes of 114 and 120 act to radially restrain friction material 102 to prevent bursting of the material. Grooves 126 and 128 enable the flow of cooling fluid across protrusions 114 and 120 and friction material 102, thus, protrusions 114 and 120 are an active part of a cooling system in which plate 100 is included. Further, the core plates act as heat sinks for the cooling fluid, improving performance of plate 100. In an example embodiment, surfaces 108 and 110 are not broken and the friction material is compressed by protrusions 114 and 120 to form grooves 126 and 128.

Advantageously, plate 100 does not require the use of adhesive to join friction material 102 to core plates 104 and 106, which are used to transmit torque from element 124 to friction material 102. That is, friction material 102 is free of adhesive between friction material 102 and protrusions 114 and 120.

FIG. 8 is a schematic representation of tooling for fabricating friction plate 100 of FIG. 2.

FIG. 9 is a cross sectional view generally along line 9-9 in FIG. 8. The following should be viewed in light of FIGS. 2 through 9. The following provides example details regarding fabrication of plate 100. The tooling required to press core plates 104 and 106 into friction material 102 is shaped such that the friction material is fully supported everywhere except where protrusions 114 and 120 are located. The support of the friction material only compress the material after protrusions 114 and 120 are pressed into the friction material. The support of the friction material is provided by springs 140, a set of stops 142 that control the compressed thickness, and stops 144 that enable the friction material to be compressed. Stops 144 also prevent pressing of protrusions 114 and 120 from only one side. Protrusions 114 and 120 also are fully supported and centered on protrusions 116 and 122, respectively.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A friction plate, comprising:
a ring-shaped piece of friction material with an inner circumference, and first and second surfaces facing in first and second opposite axial directions, respectively;
a first core plate with a first ring-shaped body, a first plurality of protrusions extending radially outward from the first ring-shaped body and imbedded in the first surface, and a second plurality of protrusions extending radially inward from the first ring-shaped body; and,
a second core plate with a second ring-shaped body, a third plurality of protrusions extending radially outward from the second ring-shaped body and embedded in the second surface, and a fourth plurality of protrusions extending radially inward from the second ring-shaped body, wherein:
the first and second bodies are at least partially disposed radially inward of the inner circumference; and,
the second and fourth pluralities of protrusions are for engagement with a rotatable element.

2. The friction plate of claim 1, wherein:
the piece of friction material includes an outer circumference;
the first plurality of protrusions form respective portions of a first plurality of grooves in the first surface connecting the inner and outer circumferences; and,
the third plurality of protrusions form respective portions of a second plurality of grooves in the second surface connecting the inner and outer circumferences.

3. The friction plate of claim 1, wherein:
a radial line equally divides the piece of friction material in an axial direction;
the first and third pluralities of protrusions include third and fourth surfaces facing substantially in the first and second axial directions, respectively; and,
the third and fourth surfaces are closer to the line than respective portions the first and second surfaces not axially aligned with the first and third pluralities of protrusions, respectively.

4. The friction plate of claim 2, wherein the first and third pluralities of protrusions terminate at the outer circumference.

5. The friction plate of claim 1, further comprising an axis of rotation, wherein:
the first and third pluralities of protrusions include first and second protrusions, respectively, in sequence in a circumferential direction; and,
the first and second protrusions are symmetrical about a line passing through the axis of rotation and between the first and second protrusions.

6. The friction plate of claim 5, wherein the first and second protrusions taper away from the line from the inner circumference to the outer circumference.

7. The friction plate of claim 5, wherein the first and second protrusions taper toward the line from the inner circumference to the outer circumference.

8. The friction plate of claim 1, wherein the first and third pluralities of protrusions are non-aligned in an axial direction.

9. The friction plate of claim 1, wherein respective protrusions from the first and third pluralities of protrusions alternate in a circumferential direction.

10. The friction plate of claim 1, wherein the first and second bodies are in contact.

11. The friction plate of claim 1, wherein the second and fourth pluralities of protrusions are aligned in an axial direction.

12. The friction plate of claim 1, wherein the piece of friction material is free of adhesive between the piece of friction material and the first and third pluralities of protrusions.

13. The friction plate of claim 1, wherein:
the piece of friction material has a thickness in an axial direction; and,
respective depths of penetration of the first and third pluralities of protrusions in the axial direction in the first and second surfaces, respectively, are no greater than one half the thickness.

14. The friction plate of claim 1, wherein:
the piece of friction material has a thickness in an axial direction; and,
respective depths of penetration of the first and third pluralities of protrusions in the axial direction in the first and second surfaces, respectively, are greater than one half the thickness.

15. A friction plate, comprising:
a ring-shaped piece of friction material with an inner circumference, and first and second surfaces facing in first and second opposite axial directions, respectively;
a first core plate with a first ring-shaped body, a first plurality of protrusions extending radially outward from the first ring-shaped body and tilted in a first circumferential direction, and a second plurality of protrusions extending radially inward from the first ring-shaped body; and,
a second core plate with a second ring-shaped body, a third plurality of protrusions extending radially outward from the second ring-shaped body and tilted in a second circumferential direction, opposite the first circumferential direction, and a fourth plurality of protrusions extending radially inward from the second ring-shaped body, wherein:
the first and third pluralities of protrusions are imbedded in the first and second surfaces, respectively;
the first and second bodies are disposed at least partially radially inward of the inner circumference; and,
the second and fourth pluralities of protrusions are aligned in an axial direction and are for engagement with a rotatable element.

16. The friction plate of claim 15, wherein the first and third pluralities of protrusions are misaligned in an axial direction.

17. A friction plate, comprising:
a ring-shaped piece of friction material with inner and outer circumferences, and first and second surfaces facing in first and second opposite axial directions, respectively;
a first core plate with: a first ring-shaped body; a first plurality of protrusions embedded in the first surface, extending radially outward from the first ring-shaped body, and tilted in a first circumferential direction; and a second plurality of protrusions extending radially inward from the first ring-shaped body;
a second core plate with: a second ring-shaped body; a third plurality of protrusions embedded in the second surface, extending radially outward from the second ring-shaped body, and tilted in a second circumferential direction, opposite the first circumferential direction; and a fourth plurality of protrusions extending radially inward from the second ring-shaped body;
a first plurality of grooves in the first surface, connecting the inner and outer circumferences, and at least partially formed by the first plurality of protrusions; and,
a second plurality of grooves in the second surface, connecting the inner and outer circumferences, and at least partially formed by the third plurality of protrusions, wherein:
the first and second bodies are at least partially disposed radially inward of the inner circumference; and,
the second and fourth pluralities of protrusions are aligned in a axial direction and are for engagement with a rotatable element.

18. The friction plate of claim 17, wherein the first and third pluralities of protrusions are misaligned in an axial direction.

* * * * *